(12) United States Patent
Yano et al.

(10) Patent No.: US 7,216,060 B1
(45) Date of Patent: May 8, 2007

(54) EQUIPMENT INSPECTION SUPPORT SYSTEM, EQUIPMENT INSPECTION SUPPORT METHOD, AND PROGRAM THEREFOR

(75) Inventors: Ai Yano, Kawasaki (JP); Tatsuro Matsumoto, Kawasaki (JP); Kazuo Sasaki, Kawasaki (JP); Satoru Watanabe, Kawasaki (JP); Masayuki Fukui, Kawasaki (JP); Eiichi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/336,940

(22) Filed: Jan. 23, 2006

(30) Foreign Application Priority Data

Oct. 28, 2005 (JP) ............................. 2005-314340

(51) Int. Cl.
*G06F 11/30* (2006.01)
*G21C 17/00* (2006.01)
(52) U.S. Cl. .................................... 702/184
(58) Field of Classification Search ............... 702/134, 702/182–184, 188
See application file for complete search history.

(56) References Cited

U.S. PATENT DOCUMENTS

2006/0017911 A1 * 1/2006 Villar et al. ............... 356/4.01

FOREIGN PATENT DOCUMENTS

JP 11-134369 5/1999

* cited by examiner

*Primary Examiner*—Michael Nghiem
(74) *Attorney, Agent, or Firm*—Staas & Halsey LLP

(57) ABSTRACT

An equipment inspection support system, equipment inspection support method, and program including maintenance and inspection management unit selecting and transmitting to a terminal device inspection item contents stored in contents storage unit, receiving inspection result data transmitted from terminal device; timing determination unit determining status information acquisition timing by status information acquisition device based on inspection item contents transmitted to terminal device by maintenance and inspection management unit and the inspection result data transmitted from the terminal device; status information acquisition unit collecting status information acquired by the status information acquisition device according to status information acquisition timing determined by timing determination unit; result data control unit creating result data correspondence table associating the inspection result data received by maintenance and inspection management unit and status information collected by the status information acquisition unit; and inspection result storage unit storing inspection result data, status information and result data correspondence table.

11 Claims, 14 Drawing Sheets

| Inspection item name | Inspection result | Image file name |
|---|---|---|
| Inspection item 1 | Good | 2005120_1.mov |
| Inspection item 2 | Good | 2005120_2.mov |
| Inspection item 3 | ... | ... |
| ... | ... | ... |

*Fig. 5*

Video = hoge.fujitsu.com (In a case of an image server)
Video_tanaka = tanaka.cam.fujitsu.com (In a case that a camera carried by an inspection technician is a Web camera)
...

*Fig. 7* video = hoge.video.fujitsu.com (In a case of an image server)
voice = hoge.voice.fujitsu.com (In a case of a voice data collection server)
smell = hoge.smell.fujitsu.com (In a case of an odor data collection server)
...

*Fig. 8*

EQUIPMENT INSPECTION SUPPORT SYSTEM, EQUIPMENT INSPECTION SUPPORT METHOD, AND PROGRAM THEREFOR

BACKGROUND OF THE INVENTION

1. Field of the Invention

The present invention relates to an equipment inspection system, equipment inspection method, and program therefor; more specifically, it relates to an equipment inspection support system, equipment inspection method, and program therefor using multimodal control in which a plurality of interfaces work together.

2. Background Information

When performing maintenance/inspection work on equipment at a power plant, manufacturing plant or other large plant, an inspection technician brings to the site a paper inspection list on which a plurality of inspection items are printed, and in accordance with this inspection list, performs visual inspection, measurement, and adjustment. In accordance with the inspection list, the inspection technician sequentially locates and visually inspects sections to be inspected, and enters inspection results, such as yes/no and measurement values before and after adjustment, into applicable boxes on the inspection list. After completing such inspection work, the inspection technician brings back the inspection list on which the inspection results are entered to a facility management center, and inputs the inspection results into a management system such as a host computer.

In this case, because there are many pieces of equipment to be inspected at the site or inspection items, work efficiency on site is low, resulting in incorrect entry or omission of inspection results. There may also be cases where, due to error or negligence when an inspection technician has become overly familiar with the operations, non-factual inspection results and measured values may be entered. To prevent such inspection result entry mistakes and skipping of inspection items, an inspection technician may be accompanied by an observer who observes the inspection operation, but this entails the problem of increased labor costs.

As an alternative to having such an accompanying observer, an inspection technician is made to carry a small video camera, record images during the inspection, and bring the images back together with the inspection results. In this case, the inspection technician inputs the inspection results and images from the inspection operation into a management system to store the inspection result data and images in a correlated manner. Thereafter, a person in charge matches the inspection result data and images to check for omissions, input mistakes or the like. In this case, when there are a great number of pieces of equipment and inspection items, the correlation of inspection result data with images for each inspection item is complicated, with the danger of incorrect input.

SUMMARY OF THE INVENTION

The present invention provides an equipment inspection support system, equipment inspection support method, and program therefor to improve work efficiency and enhance inspection result data reliability of equipment maintenance inspection work at a large plant and the like where there are a great many inspection items.

The equipment inspection support system relating to a first aspect of the present invention is used to support an inspection technician who is to perform equipment maintenance inspection by operating 1) a terminal device for sequentially displaying details of work to be performed by such inspection technician and for receiving input of inspection result data from the maintenance inspection work, and 2) a status information acquisition device for acquiring status information of a maintenance and inspection work site. The inspection result data input into the terminal device is acquired, and status information acquired by the status information acquisition device is collected. The system comprises a contents storage unit for storing the inspection item contents for each maintenance and inspection work to be transmitted to the terminal device and interaction scenarios for determining the order of the inspection item contents to be transmitted to the terminal device according to the equipment maintenance inspection procedures; a maintenance and inspection management unit for selecting and transmitting to the terminal device the inspection item contents stored in the contents storage unit based on the interaction scenario stored in the contents storage unit and the inspection result data transmitted from the terminal device, and receiving the inspection result data transmitted from the terminal device; a timing determination unit for determining timing for status information acquisition by the status information acquisition device based on the inspection item contents transmitted to the terminal device by the maintenance and inspection management unit and the inspection result data transmitted from the terminal device; a status information acquisition unit for collecting the status information acquired by the status information acquisition device according to the status information acquisition timing determined by the timing determination unit; a result data control unit for creating a result data correspondence table for associating the inspection result data received by the maintenance and inspection management unit with the status information collected by the status information acquisition unit; and an inspection result storage unit for storing inspection result data, status information, and result data correspondence table.

In this case, appropriate inspection item contents are sequentially transmitted from the maintenance and inspection management unit to the terminal device operated by the inspection technician and instructions for maintenance and inspection work are given to the inspection technician to assist with the work, and inspection result data transmitted from the terminal device is acquired and stored in the inspection result storage unit and managed therein. Here, the status information acquired by the status information acquisition unit at the appropriate time is associated with the inspection result data and stored in the inspection result storage unit, thereby allowing easy detection of inspection result data omission and input errors.

The equipment inspection support system relating to a second aspect of the present invention is an equipment inspection support system according to the first aspect, wherein the status information acquisition device is a video camera for acquiring image data of the maintenance and inspection work site.

In this case, the image data of the maintenance and inspection work site and the inspection result data can be associated with each other and thus managed, thereby allowing easy detection of inspection result data omission, input mistakes, or the like.

The equipment inspection support system relating to a third aspect of the present invention is an equipment inspection support system according to the second aspect, wherein the status information acquisition device further comprises one or more sensors from among such sensors as a condenser microphone, odor sensor, temperature sensor, humidity sensor, tactile sensor, pressure sensor and the like for acquiring status information of the maintenance and inspection work site other than image data.

In this case, omission, input mistakes or the like of the inspection result data can be easily detected based on the correlated status information from the various sensors of the maintenance and inspection work site.

The equipment inspection support system relating to a fourth aspect of the present invention is an equipment inspection support system according to the third aspect, wherein the timing determination unit comprises a result data judgment unit for judging whether the inspection result data is normal or abnormal, and when the status information acquisition device is a video camera, regardless of whether the judgment result by the result data judgment unit was normal or abnormal, the status information collected by the status information acquisition unit is correlated with inspection result data and stored in the inspection result storage unit, and when the status information acquisition device is not a video camera, only when the judgment by the result data judgment unit was abnormal, the status information collected by the status information acquisition unit is correlated with the inspection result data and stored in the inspection result storage unit.

In this case, inspection result data omission and input errors can be easily detected using image data, and when inspection result data is abnormal, work site conditions can be learned based on the status information from the various sensors, thereby allowing quick and appropriate measures against the abnormality.

The equipment inspection support system according to a fifth aspect of the present invention is an equipment inspection support system according to the third aspect, wherein the timing determination unit comprises a result data judgment unit for judging whether the inspection result data is normal or abnormal, and only when the judgment by the result data judgment unit is abnormal, the status information collected by the status information acquisition unit is correlated with the inspection result data and stored in the inspection result storage unit.

In this case, the volume of status information to be stored in the inspection result storage unit is reduced, thereby easing the data management burden.

The equipment inspection system relating to a sixth aspect of the present invention is an equipment inspection support system according to the second aspect, further comprising an image recognition unit for analyzing image data transmitted from the status information acquisition device for comparison with the inspection result data transmitted from the terminal device, wherein when there are inconsistencies in the image recognition unit comparison results, inspection item contents giving instructions for re-inspection of the relevant inspection item are transmitted to the terminal device by the maintenance and inspection management unit.

In this case, the status at the site of the maintenance and inspection can be easily grasped based on the image data, enabling the acquisition of highly reliable inspection result data.

The equipment inspection support system relating to a seventh aspect of the present invention is an equipment inspection support system according to any one of the first to sixth aspects, further comprising an inspection result query unit for allowing a third party to make query of the inspection result data and status information stored in the inspection result storage unit, a re-inspection instruction unit for, regarding the maintenance and inspection work corresponding to the inspection result data and status information stored in the inspection result storage unit, causing the inspection item contents for giving instructions for additional inspection to be transmitted from the maintenance and inspection management unit to the terminal device, and/or causing the status information acquisition unit to reacquire the status information from the status information acquisition device.

In this case, a third party such as a maintenance and inspection work supervisor can monitor the inspection result data and corresponding status information, and when there is a problem, can re-inspect the inspection item, reacquire status information, and otherwise take appropriate measures rapidly, thereby enhancing the reliability of the inspection result data.

The equipment inspection support system relating to an eighth aspect of the present invention is an equipment inspection support system according to the first aspect, wherein a status information server that adds metadata to the status information for associating the status information acquired by the status information acquisition device with the inspection item contents in the terminal device and manages the same, is connected to the status information acquisition device, and the status information acquisition unit acquires at once status information relating to a plurality of maintenance and inspection operations from the status information server.

In this case, the amount of data transmitted can be reduced, enabling operations to be performed even in less than ideal communication environments, and thereby enhancing inspection result data reliability.

The equipment inspection support system relating to a ninth aspect of the present invention is an equipment inspection support system according to the first aspect, wherein inspection result data and status information is stored together with a time stamp based on input time, and further comprising a data security management unit that deems as valid, from among status information associated with inspection result data, only the status information input during a certain period of time after input of the inspection result data.

The equipment inspection support system relating to a tenth aspect of the present invention is an equipment inspection support system according to the first aspect, wherein status information acquisition means inserts additional information such as maintenance and inspection work location, acquisition time, inspection technician data and the like into acquired status information using an invisible digital watermark.

The equipment inspection support system relating to an eleventh aspect of the present invention is an equipment inspection support system according to the first aspect, further comprising a result confirmation unit for comparing, in time series and for each maintenance and inspection operation, inspection result data stored in the inspection result storage unit.

The equipment inspection support system relating to a twelfth aspect of the present invention is an equipment inspection support system according the second aspect, further comprising an object of inspection detector for performing image recognition of image data from the status information acquisition device, determining the identification code attached to the equipment or device to be inspected, and determining conformity with the inspection item contents currently being processed by the maintenance and inspection management unit.

The equipment inspection support method relating to a thirteenth aspect of the present invention is used to support an inspection technician who is to perform equipment maintenance inspection by operating 1) a terminal device for sequentially displaying details of work to be performed by such inspection technician and for receiving input of inspection result data from the maintenance inspection work, and 2) a status information acquisition device for acquiring status information of a maintenance and inspection work site. The inspection result data input into the terminal device is acquired, and status information acquired by the status information acquisition device is collected. The method comprising the steps of storing the inspection item contents for each maintenance and inspection work to be transmitted to the terminal device and interaction scenarios for determining the order of the inspection item contents to be transmitted to the terminal device according to the equipment maintenance inspection procedures; selecting and transmitting to the terminal device the inspection item contents stored in the contents storage unit based on the interaction scenario stored in the contents storage unit and the inspection result data transmitted from the terminal device, and receiving the inspection result data transmitted from the terminal device; determining timing for status information acquisition by the status information acquisition device based on the inspection item contents transmitted to the terminal device by the maintenance and inspection management unit and the inspection result data transmitted from the terminal device; collecting the status information acquired by the status information acquisition device according to the status information acquisition timing determined by the timing determination unit; creating a result data correspondence table for associating the inspection result data received by the maintenance and inspection management unit with the status information collected by the status information acquisition unit; and storing the inspection result data, status information, and result data correspondence table.

In this case, appropriate inspection item contents are sequentially transmitted to the terminal device operated by the inspection technician and instructions for maintenance and inspection work are given to the inspection technician to assist with the work, and inspection result data transmitted from the terminal device is acquired and stored in the inspection result storage unit, and thus managed therein. Here, the status information acquired by the status information acquisition unit at the appropriate time is associated with the inspection result data and stored in the inspection result storage unit, thereby allowing easy detection of inspection result data omission and input errors.

A program relating to a fourteenth aspect of the present invention causes a computer to execute an equipment inspection support method that is used to support an inspection technician who is to perform equipment maintenance inspection by operating 1) a terminal device for sequentially displaying details of work to be performed by such inspection technician and for receiving input of inspection result data from the maintenance inspection work, and 2) a status information acquisition device for acquiring status information of a maintenance and inspection work site. The inspection result data input into the terminal device is acquired, and status information acquired by the status information acquisition device is collected. The method comprises the steps of storing the inspection item contents for each maintenance and inspection work to be transmitted to the terminal device and interaction scenarios for determining the order of the inspection item contents to be transmitted to the terminal device according to the equipment maintenance inspection procedures; selecting and transmitting to the terminal device the inspection item contents stored in the contents storage unit based on the interaction scenario stored in the contents storage unit and the inspection result data transmitted from the terminal device, and receiving the inspection result data transmitted from the terminal device; determining timing for status information acquisition by the status information acquisition device based on the inspection item contents transmitted to the terminal device by the maintenance and inspection management unit and the inspection result data transmitted from the terminal device; collecting the status information acquired by the status information acquisition device according to the status information acquisition timing determined by the timing determination unit; creating a result data correspondence table for associating the inspection result data received by the maintenance and inspection management unit with the status information collected by the status information acquisition unit; and storing the inspection result data, status information, and result data correspondence table.

With the present invention, by transmission of appropriate inspection item contents to an inspection technician performing maintenance and inspection work, assistance is given for the maintenance and inspection work, and inspection result data can be easily acquired; further, by automatically acquiring status information of the maintenance and inspection work site, associating the same with inspection result data, and storing the same, easy detection can be made of skipped inspections, input mistakes, or the like that may happen during maintenance and inspection operations, thereby enhancing reliability of inspection result data These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is a diagram for explaining a result data correspondence table;

FIG. 7 is a diagram for explaining one example of an image server definition file;

FIG. 8 is a diagram for explaining one example of a status information collection server definition file;

DETAILED DESCRIPTION OF THE PREFERRED EMBODIMENTS

The present invention will be explained in detail based on the embodiments.

Schematic Configuration 1

Figure 1:
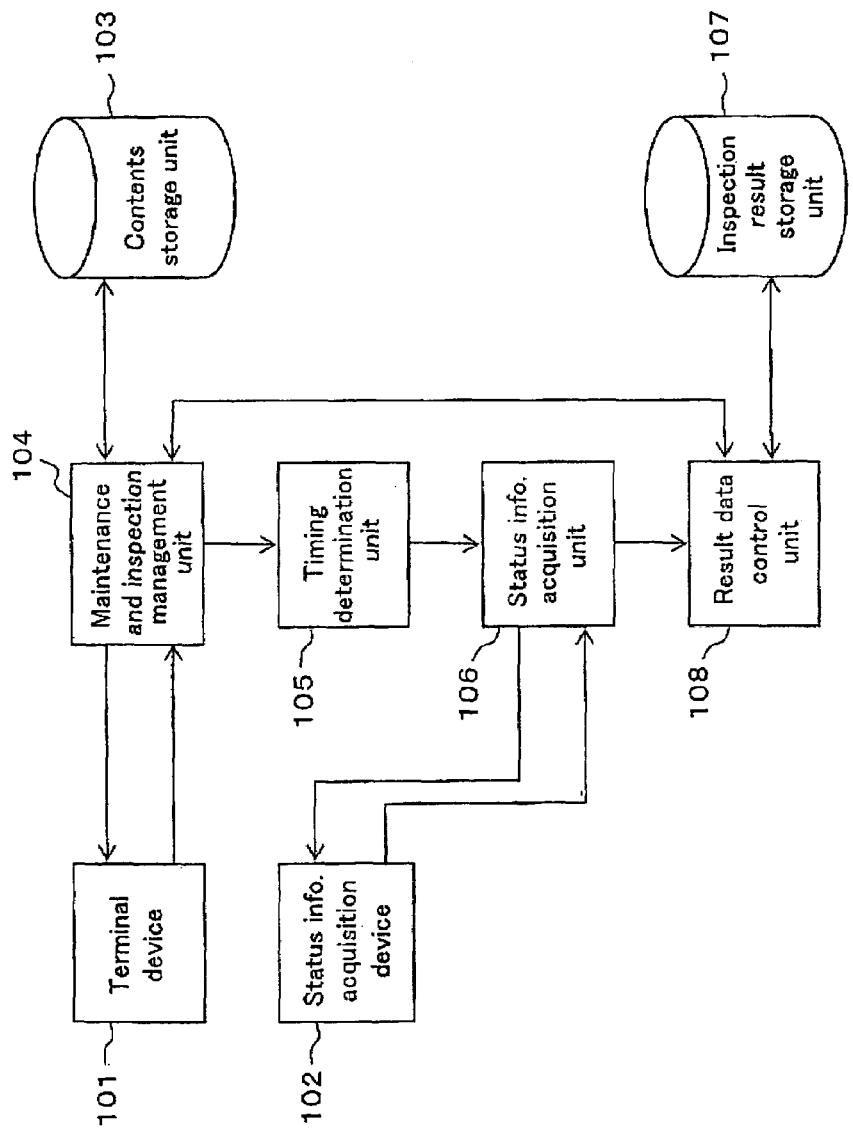
FIG. 1 is a diagram for explaining a schematic configuration of an equipment inspection support system according to the present invention.

FIG. 1 shows a schematic configuration of an equipment inspection support system relating to a first embodiment of the present invention.

With this system, an inspection technician performing equipment maintenance and inspection work carries a terminal device 101 for sequentially displaying operation details and for allowing the operator to input inspection result data regarding the maintenance and inspection work, and a status information acquisition device 102 for acquiring status information of the maintenance and inspection work site. Here, the terminal device 101 is a communication terminal capable of communicating with a maintenance and inspection work management center, for which PDAs, PCs, cell phones, and other communication devices may be used. Further, the status information acquisition device 102 is a device for acquiring status information corresponding to the type of maintenance and inspection work being carried out, conditions of the site, or other such factors, and it may be a video camera and condenser microphone, and one or more sensors from among such sensors as a temperature sensor, humidity sensor, odor sensor, tactile sensor, pressure sensor and the like, to be carried by the inspection technician.

The equipment inspection support system comprises a contents storage unit 103, maintenance and inspection management unit 104, timing determination unit 105, status information acquisition unit 106, result data control unit 108, and inspection result storage unit 107.

The contents storage unit 103 has stored therein inspection item contents for each maintenance and inspection operation, such contents to be transmitted to the terminal device 101, and interaction scenarios for determining the order of the inspection item contents to be transmitted to the terminal device 101, based on the equipment maintenance and inspection work procedures.

The maintenance and inspection management unit 104, based on the interaction scenarios stored in the contents storage unit 103 and inspection result data transmitted from the terminal device 101, selects and transmits to the terminal device 101 inspection item contents stored in the contents storage unit 103 and receives the inspection result data transmitted from the terminal device 101.

The timing determination unit 105 determines timing for status information acquisition by the status information acquisition device 102 based on the inspection item contents transmitted to the terminal device 101 by the maintenance and inspection management unit 104 and the inspection result data transmitted from the terminal device 101. If the status information acquisition device 102 is a video camera, the timing determination unit 105 may be configured so as to determine timing for start of recording based on the timing of transmission of the inspection item contents, and to determine timing for stop of recording based on the timing of receipt of the inspection result data from the terminal device 101. Further, when the status information acquisition device 102 is a sensor, the timing determination unit 105 may be configured so as to acquire status information corresponding to the relevant inspection item while the work is in progress.

The timing determination unit 105 may be configured so as to comprise a result data judgment unit (not shown in the drawings) for judging whether the inspection result data is normal or abnormal. For example, when the status information acquisition device 102 is a video camera, regardless of whether the judgment by the result data judgment unit is normal or abnormal, the status information collected by the status information acquisition unit 106 is correlated with the inspection result data and stored in the inspection result storage unit 107, and when the status information acquisition device 102 is a device other than a video camera, only when the judgment by the result data judgment unit is abnormal, is the status information collected by the status information acquisition unit 106 correlated with the inspection result data and stored in the inspection result storage unit 107.

Further, the timing determination unit 105 comprises a result data judgment unit (not shown in the drawings) for judging whether the inspection result data is normal or abnormal, and it may be configured so that, only when the judgment result by the result data judgment unit is abnormal, is the status information collected by the status information acquisition unit 106 correlated with the inspection result data and stored in the inspection result storage unit 107.

The status information acquisition unit 106 collects status information acquired by the status information acquisition device 102 in accordance with the status information acquisition timing determined by the timing determination unit 105. When the status information acquisition device 102 is a video camera, recording of image data is started by the status information acquisition device 102 at the recording start timing determined by the timing determination unit 105, and recording of image data recording is stopped by the status information acquisition device 102 at the recording stop timing.

The result data control unit 108 creates a result data correspondence table that associates inspection result data received by the maintenance and inspection management unit 104 with status information collected by the status information acquisition unit 106. For example, when the status information acquisition device 102 is a video camera, a file name is provided to image data constituting moving images, and a result data correspondence table is generated in which inspection result data is associated with image data file names for the respective inspection items.

The inspection result storage unit 107 has stored therein the inspection result data received by the maintenance and inspection management unit 104, the status information acquired by the status information acquisition unit 106, and the result data correspondence table generated by the result data control unit 108.

Schematic Configuration 2

Figure 2:
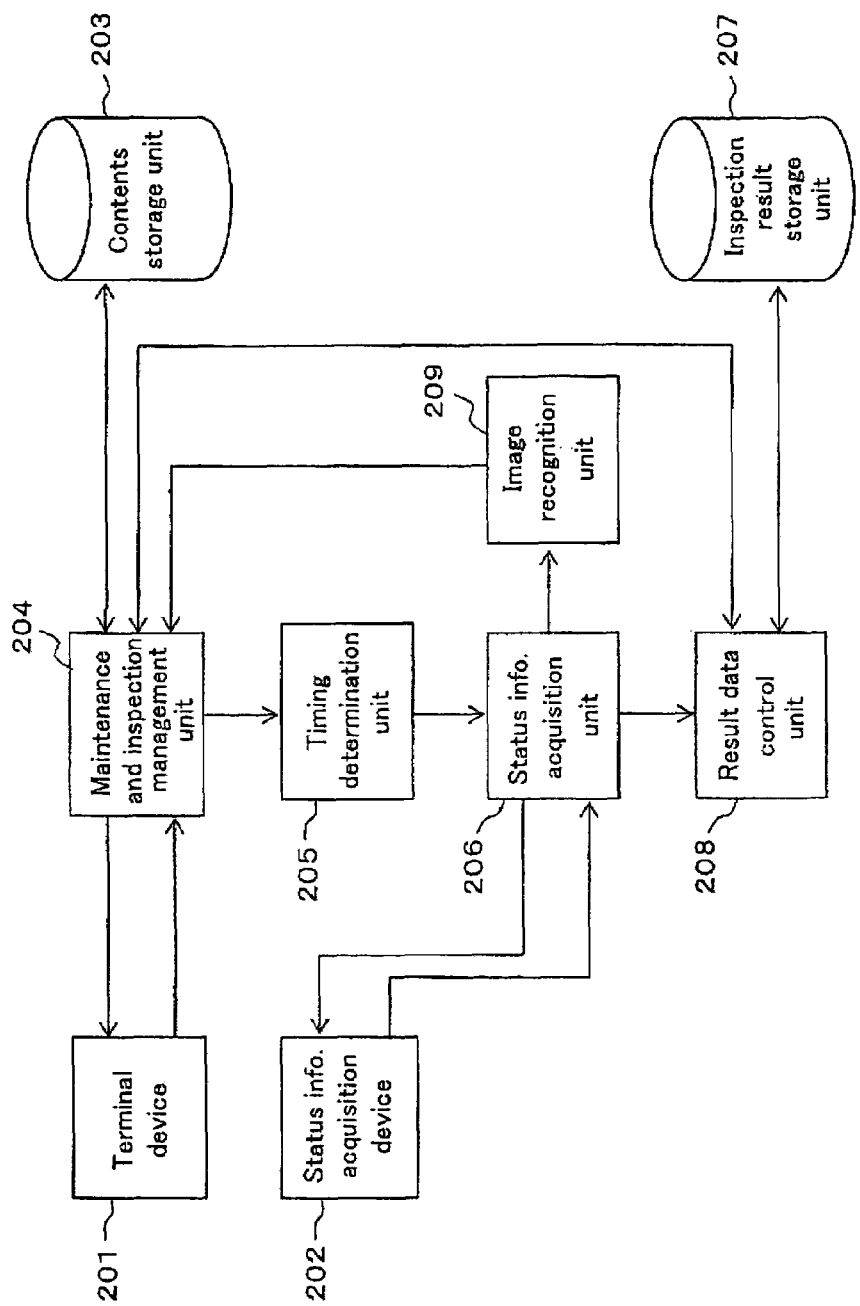
FIG. 2 is a diagram for explaining another example of a schematic configuration of an equipment inspection support system according to the present invention.

FIG. 2 shows a schematic configuration of an equipment inspection support system according to another embodiment of the present invention.

As with the above-described system, an inspection technician performing equipment maintenance and inspection work carries a terminal device 201 for sequentially displaying operation details and for allowing the operator to input inspection result data regarding the maintenance and inspection work, and a status information acquisition device 202 for acquiring status information of the maintenance and inspection work site. Here, the terminal device 2101 is a communication terminal capable of communicating with a maintenance and inspection work management center, for which PDAs, PCs, cell phones, and other communication devices may be used. Further, the status information acquisition device 202 is a device for acquiring status information corresponding to the type of maintenance and inspection work being carried out, conditions of the site status, or other such factors, and it comprises at least a video camera, and if necessary may also comprise a condenser microphone, and one or more sensors from among such sensors as a temperature sensor, humidity sensor, odor sensor, tactile sensor, pressure sensor and the like, to be carried by the inspection technician.

The equipment inspection support system comprises a contents storage unit 203, maintenance and inspection management unit 204, timing determination unit 205, status information acquisition unit 206, result data control unit 208, image recognition unit 209 and inspection result storage unit 207.

The contents storage unit 203, maintenance and inspection management unit 204, timing determination unit 205, status information acquisition unit 206, result data control unit 208 and inspection result storage unit 207 have configurations identical respectively to the contents storage unit 103, maintenance and inspection management unit 104, timing determination unit 105, status information acquisition unit 106, result data control unit 108 and inspection result storage unit 107 shown in FIG. 1, and explanations thereof are omitted here.

The image recognition unit 209 analyzes image data transmitted from the status information acquisition device 202, and compares the same with inspection result data transmitted from the terminal device 201. When the comparison by the image recognition unit 209 indicates non-conformity, a signal is transmitted to the maintenance and inspection management unit 204 to the effect that there is non-conformity. In response to the signal from the image recognition unit 209 of non-conformity, the maintenance and inspection management unit 204 selects from the contents storage unit 203 inspection item contents for giving re-inspection instructions regarding the relevant inspection item, and transmits such inspection item contents to the terminal device 201.

Schematic Configuration 3

Figure 3:
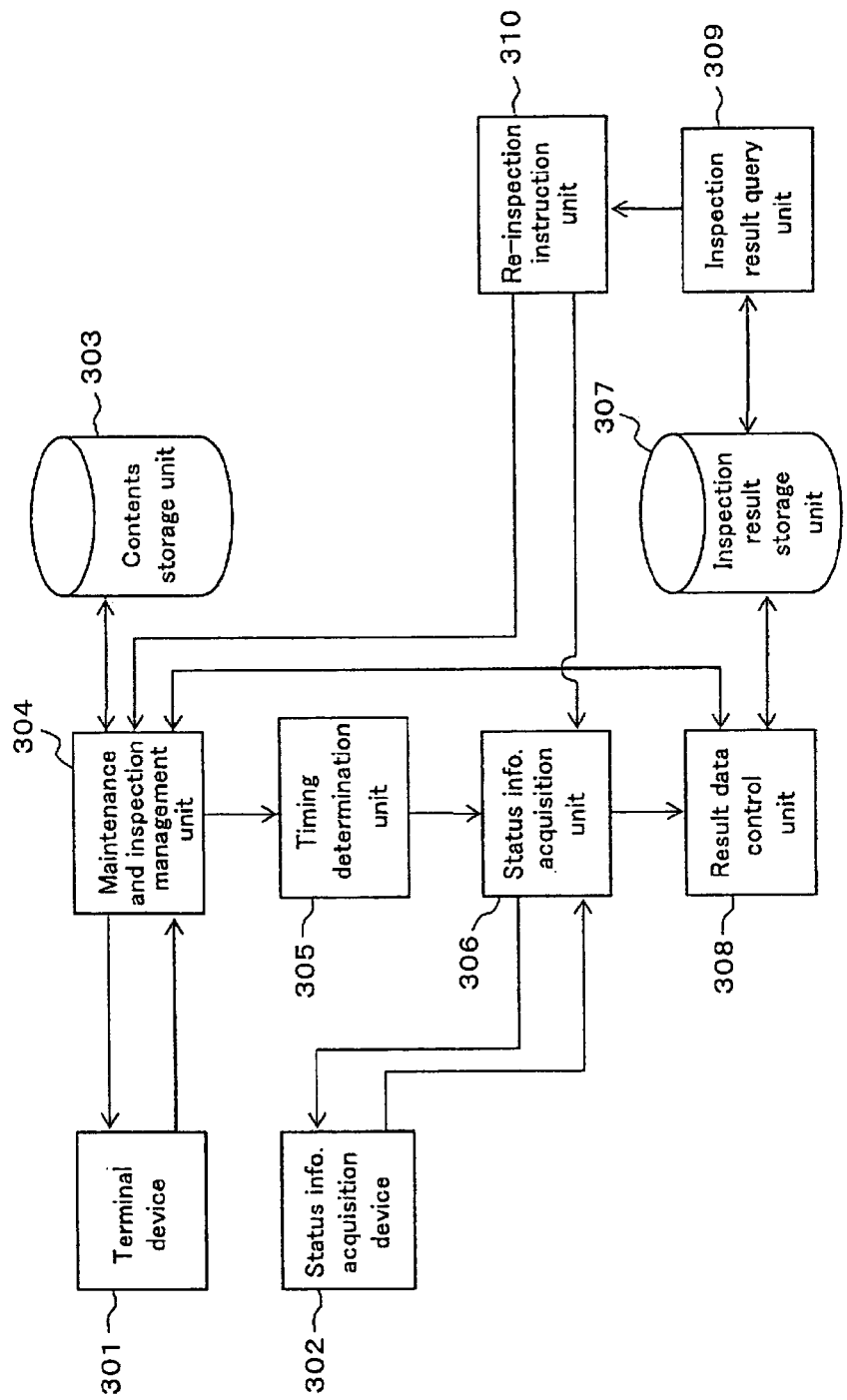
FIG. 3 is a diagram for explaining yet another example of a schematic configuration of an equipment inspection support system according to the present invention.

FIG. 3 shows a schematic configuration of an equipment inspection support system according to yet another embodiment of the present invention.

As with the above described systems, an inspection technician performing equipment maintenance and inspection work carries a terminal device 301 for sequentially displaying operation details and for allowing the operator to input inspection result data regarding the maintenance and inspection work, and a status information acquisition device 302 for acquiring status information of the maintenance and inspection work site. Here, the terminal device 301 is a communication terminal capable of communicating with a maintenance and inspection work management center, for which PDAs, PCs, cell phones, and other communication devices may be used. Further, the status information acquisition device 302 is a device for acquiring status information corresponding to the type of maintenance and inspection work being carried out, conditions of the site status, or other such factors, and it may be a video camera and condenser microphone, and one or more sensors from among such sensors as a temperature sensor, humidity sensor, odor sensor, tactile sensor, pressure sensor and the like, to be carried by the inspection technician.

The equipment inspection support system comprises a contents storage unit 303, maintenance and inspection management unit 304, timing determination unit 305, status information acquisition unit 306, result data control unit 308, inspection result storage unit 307, inspection result query unit 309 and re-inspection instruction unit 310.

The contents storage unit 303, maintenance and inspection management unit 304, timing determination unit 305, status information acquisition unit 306, result data control unit 308 and inspection result storage unit 307 have configurations identical respectively to the contents storage unit 103, maintenance and inspection management unit 104, timing determination unit 105, status information acquisition unit 106, result data control unit 108 and inspection result storage unit 107 shown in FIG. 1, and the explanations thereof are omitted here.

The inspection result query unit 309 allows a third party to query the inspection result data and status information stored in the inspection result storage unit 307.

The re-inspection instruction unit 310, with respect to the maintenance and inspection work corresponding to the inspection result data and status information stored in the inspection result storage unit 307, causes the inspection item contents for giving instructions for additional inspection to be transmitted from the maintenance and inspection management unit 304 to the terminal device 301.

For example, when a personal computer operated by a maintenance and inspection work supervisor or other person in charge of operations is connected to the terminal device 301 via a network, such computer can be operated to call up for display on the PC monitor the inspection result data and status information stored in the inspection result storage unit 307, enabling the data to be checked. If as a result of the check by the supervisor or person in charge, it is found that the data is not in conformity, instructions for re-inspection or reacquisition of status information are received and the respective instructions are given to the maintenance and inspection management unit 304.

First Embodiment

Figure 4:
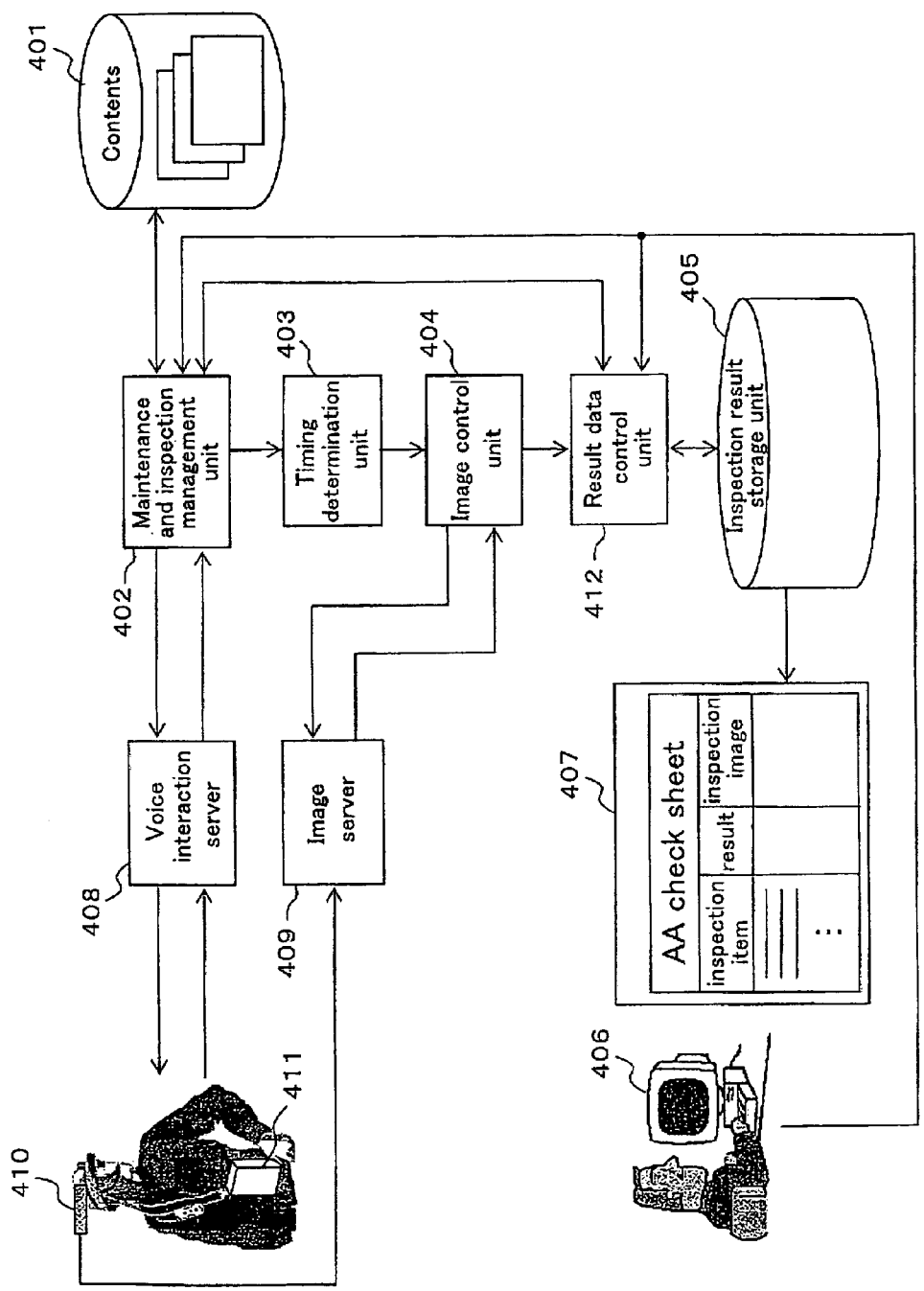
FIG. 4 is a block diagram of the first embodiment of the present invention.

Next, a first embodiment of the present invention will be explained with reference to FIG. 4.

The explanation will be given for a case where an inspection technician carries a terminal device 411 for presentation of inspection item contents through voice interaction and for input of inspection results, and a video camera 410 for acquiring image data as a status information acquisition device.

A contents storage unit 401 has stored therein inspection item contents for each maintenance and inspection operation, such contents to be transmitted to the terminal device 411 carried by the inspection technician, and interaction scenarios for determining the order of the inspection item contents to be transmitted to the terminal device 411 based on the equipment maintenance and inspection operation procedures. Here, to present the inspection item contents through voice interaction, inspection item contents 1, inspection item contents 2, etc., which are written in VXML, are stored in the contents storage unit 401, together with interaction scenarios showing maintenance and inspection procedures.

A voice interaction server 408 makes request for inspection item contents to a maintenance and inspection management unit 402 based on instructions from the terminal device 411 of the inspection technician and displays the inspection item contents transmitted from the maintenance and inspection management unit 402, or it interprets the inspection item contents transmitted from the maintenance and inspection management unit 402 according to instructions from the maintenance and inspection management unit 402, performs a voice synthesizing process, and outputs the corresponding voice data to the terminal device 411. Further, when the inspection technician responds by speaking, the voice is received and recognized and transmitted to the maintenance and inspection management unit 402 as inspection result data. The voice interaction server 408 may be configured so as to operate in the same terminal having the maintenance and inspection management unit 402; alternatively, it may be contained in the terminal device 411, or it may be configured as a separate device.

The maintenance and inspection management unit 402 acquires the inspection item contents requested by the voice interaction server 408 from the contents storage unit 401. At this time, the maintenance and inspection management unit 402 acquires a contents name or a form/field name provided in the contents, and uses this as inspection item name. The maintenance and inspection management unit 402 transmits the requested inspection item contents to the voice interaction server 408, and notifies a timing determination unit 403 of the transmission timing signal for the inspection item contents.

The timing determination unit 403, based on the inspection item contents transmission timing signal received from the maintenance and inspection management unit 402, judges whether image data is to be acquired from the video camera 410, and when judgment is made that the image data is to be acquired, gives notice of a recording start command to an image control unit 404. The image control unit 404, having received the recording start command, notifies an image server 409 of the recording start command.

The inspection technician response transmitted via the terminal device 411 is subject to voice recognition processing via the voice interaction server 408, and transmitted to the maintenance and inspection management unit 402 as inspection result data. Upon receiving the inspection result data, the maintenance and inspection management unit 402 notifies the timing determination unit 403 of the reception timing signal. The timing determination unit 403, having received the reception timing signal, judges whether to stop acquiring image data, and when judgment is made that acquisition of the image data is to be stopped, a recording stop command is transmitted to the image control unit 404. The image control unit 404, having received the recording stop command, notifies the image server 409 of the recording stop command. The image control unit 404 acquires the image data recorded by the video camera 410, and notifies a result data control unit 412 of the inspection technician name and image data.

Here, the image server 409 may be configured so as to operate in the same device in which the maintenance and inspection management unit 402 is provided, be included in the terminal device 411, or be a separate device. The image server 409 can be defined by a definition file as shown in FIG. 7, so that the image control unit 404, based on this definition file, recognizes the image server 409 as the destination for notification of a recording start command and recording stop command.

The result data control unit 412 creates a result data correspondence table associating the inspection item names received from the maintenance and inspection management unit 402 with inspection result data, operator name, and image data, and stores the same in an inspection result storage unit 405.

The result data correspondence table, as shown in FIG. 5, is created so as to associate inspection item names with inspection result data and image file names. The inspection result column is constituted by entries such as yes/no, numerical data, or other data, depending on the inspection item. Further, image file names may be automatically generated when image data is acquired by the image control unit 404. In addition, when the inspection technician name is acquired, a corresponding column can be provided in the result data correspondence table so that such data can be input in such column.

Figure 6:
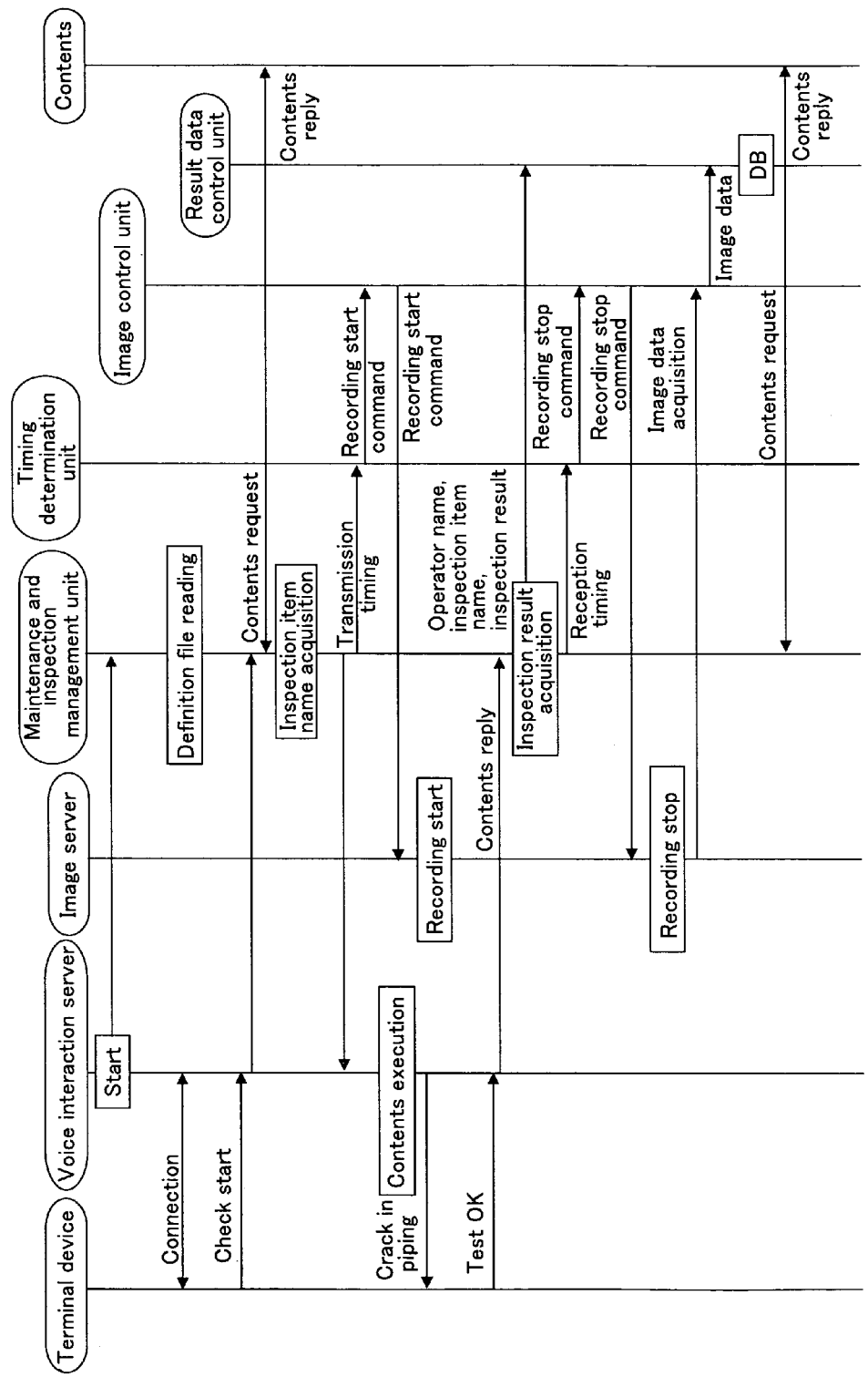
FIG. 6 is a control flowchart of the first embodiment.

With the equipment inspection support system according to the first embodiment of the present invention, processing is carried out in accordance with the flowchart shown in FIG. 6.

When the voice interaction server 408 and image server 409 are started, a connection with the maintenance and inspection management unit 402 is established, and definition files indicating respective data transmission/reception destinations are exchanged.

When an inspection technician starts up the terminal device 411, the connection with the server of the corresponding modal is established and inspection operations are commenced. Here, connection is made with the voice interaction server 408 and instructions to start inspection are transmitted. The voice interaction server 408 transmits the inspection item contents request to the maintenance and inspection management unit 402 based on the instructions from the terminal device 411.

The maintenance and inspection management unit 402 requests inspection item contents from the contents storage unit 401, and selects and transmits to the voice interaction server 408 inspection item contents stored in the contents storage unit 401. At this time, the maintenance and inspection management unit 402 acquires inspection item names from the inspection item contents, and notifies the timing determination unit 403 of the transmission timing signal that indicates that the inspection item names and inspection item contents have been transmitted. The timing determination unit 403 transmits a recording start command to the image control unit 404. The image control unit 404 transmits the recording start command to the image server 409, and causes the video camera 410 to start recording image data.

The voice interaction server 408 executes the inspection item contents, and transmits the inspection result transmitted from the terminal device 411 to the maintenance and inspection management unit 402, and at the same time it requests the subsequent inspection item contents.

The maintenance and inspection management unit 402 acquires received inspection result data, and transmits a reception timing signal to the timing determination unit 403. The timing determination unit 403 transmits a recording stop command to the image control unit 404 based on the reception timing signal. The image control unit 404 transmits a recording stop command to the image server 409, and acquires the image data recorded by the video camera 410 during the time from the transmission of the recording start command to the transmission of the recording stop command.

The maintenance and inspection management unit 402 transmits inspection technician name, inspection item names and inspection result data to the result data control unit 412, and the image control unit 404 transmits the image data to the result data control unit 412. The result data control unit 412 associates inspection technician name, inspection item names, inspection result data, and image data with one another, and stores the same in the inspection result storage unit 405.

The inspection result data and corresponding image data stored in the inspection result storage unit 405 can be referred to on a PC 406 connected over the network and operated by the maintenance management operation supervisor or person in charge. The PC 406 comprises an inspection result query unit for querying the inspection result data and the image data stored in the inspection result storage unit 405 using a browser function, and a re-inspection instruction unit for giving instructions for re-inspection based on inspection results.

Figure 9:
FIG. 9 is a diagram for explaining an inspection result query screen.

FIG. 9 shows one example of an inspection result query screen 407 displayed by the inspection result query unit. As shown in FIG. 9, the inspection result query screen comprises an inspection item display field 901, inspection result display field 902 and inspection image display field 903, and if necessary, it may be configured to display an inspection technician name. The inspection image display field 903 is configured so that image data is partly displayed as a thumbnail, and a moving image is replayed when a thumbnail is clicked.

Figure 12:
FIG. 12 is a diagram for explaining an inspection result query screen.
Figure 13:
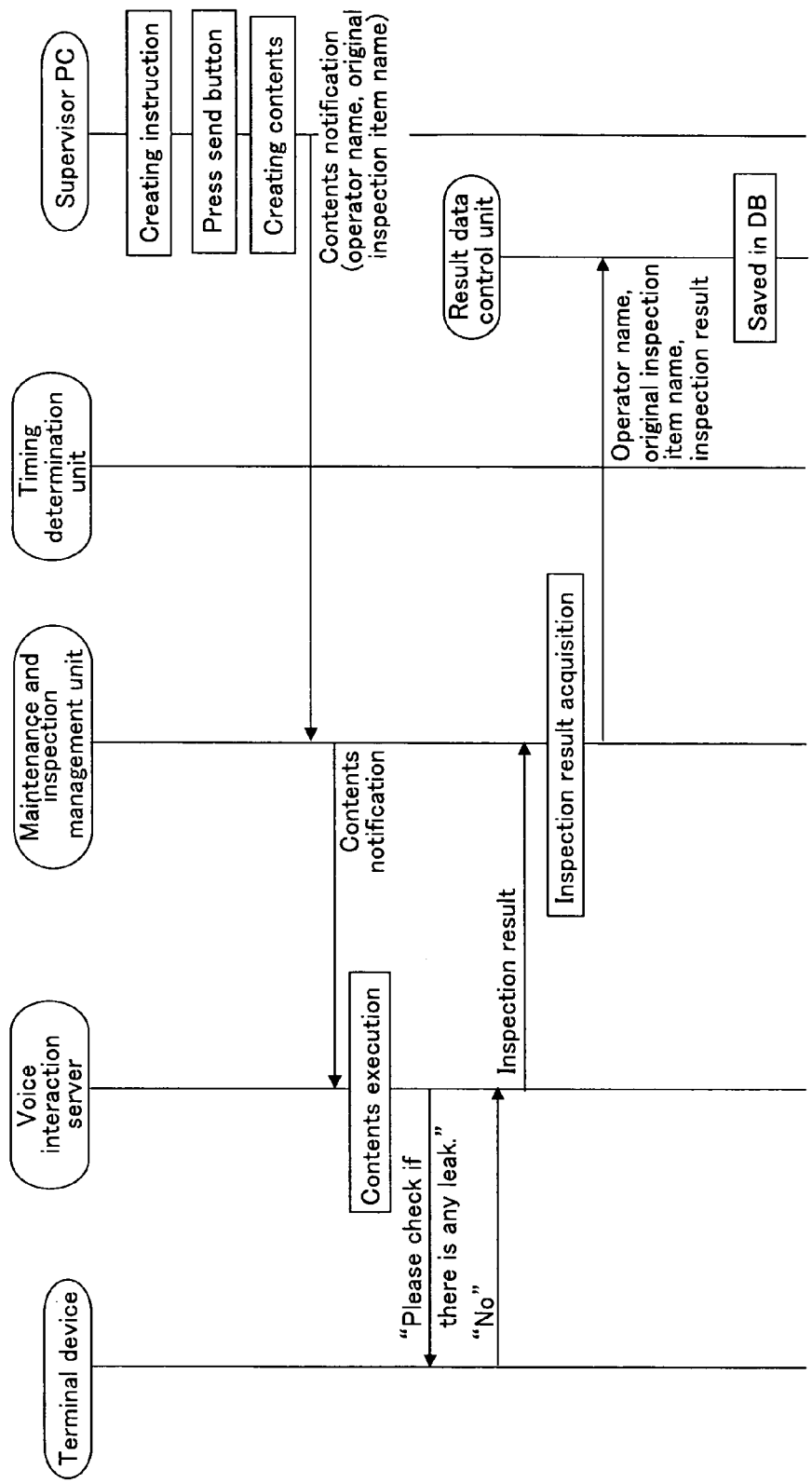
FIG. 13 is a flowchart showing processing of direct instructions according to inspection result query.

The inspection result query screen displayed by the inspection result query unit may be configured so that when inspection result data contains bad data, instructions can be sent directly from the inspection result query screen. An example of a screen thus configured is shown in FIG. 12. Further, FIG. 13 shows a flowchart of the processing at this time.

An inspection result query screen 1201 comprises an inspection item display field 1202, inspection result display field 1203, inspection image display field 1204 and direct instruction button display field 1205. Regarding the second item, for which inspection result data indicated not good, when an instruction button of the direct instruction button display field 1205 is operated, the instruction specification screen 1210 appears. This instruction specification screen 1210 comprises an instruction entry field 1211 and a send button 1212. When re-inspection instructions are input into the instruction entry field 1211 and the send button 1212 is operated, contents including the instructions are transmitted to the maintenance and inspection management unit 402. The maintenance and inspection management unit 402 transmits the contents including instructions to the voice interaction server 408. The voice interaction server 408 executes the transmitted contents and communicates the instructions to the terminal device 411, and the inspection result data transmitted from the inspection technician via the terminal device 411 is transmitted to the maintenance and inspection management unit 402 via the voice interaction server 408. With such a configuration, the inspection technician can perform re-inspection based on instructions from a remote location.

Variations

The above explanation was of an example of a status information acquisition device using the video camera 410 to acquire site image data. Alternatively, various sensors may be used to acquire status information.

For example, through use of a condenser microphone, odor sensor, temperature sensor, humidity sensor, tactile sensor, pressure sensor, and other such sensors, environment information of a maintenance and inspection work site can be learned. The sensors may be respectively connected to a data server, and detected data is input into the data server. For example, by establishing data server definition file as shown in FIG. 8, such a data server can execute notices from the status information acquisition unit.

Second Embodiment

Figure 10:
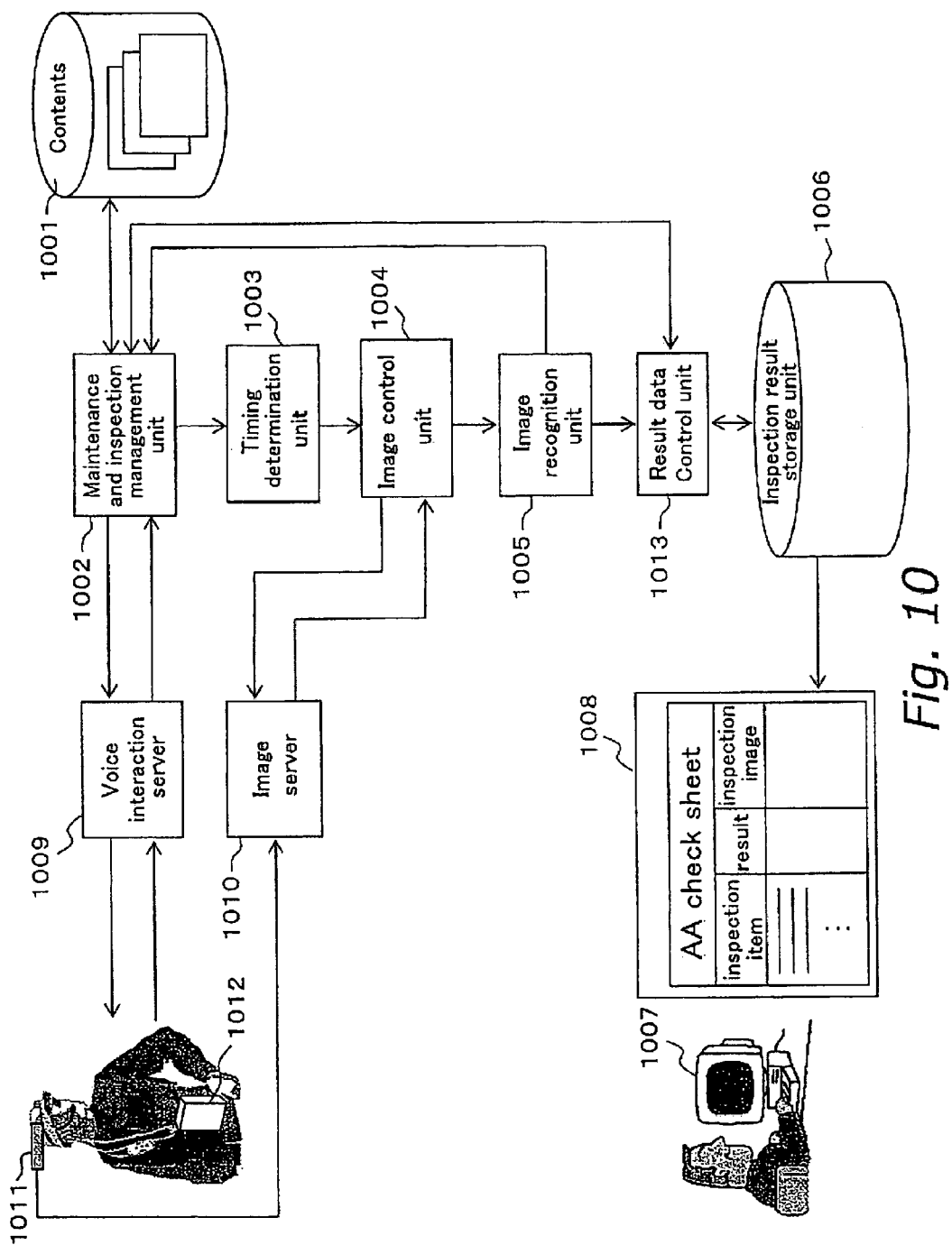
FIG. 10 is a block diagram of the second embodiment.
Figure 11:
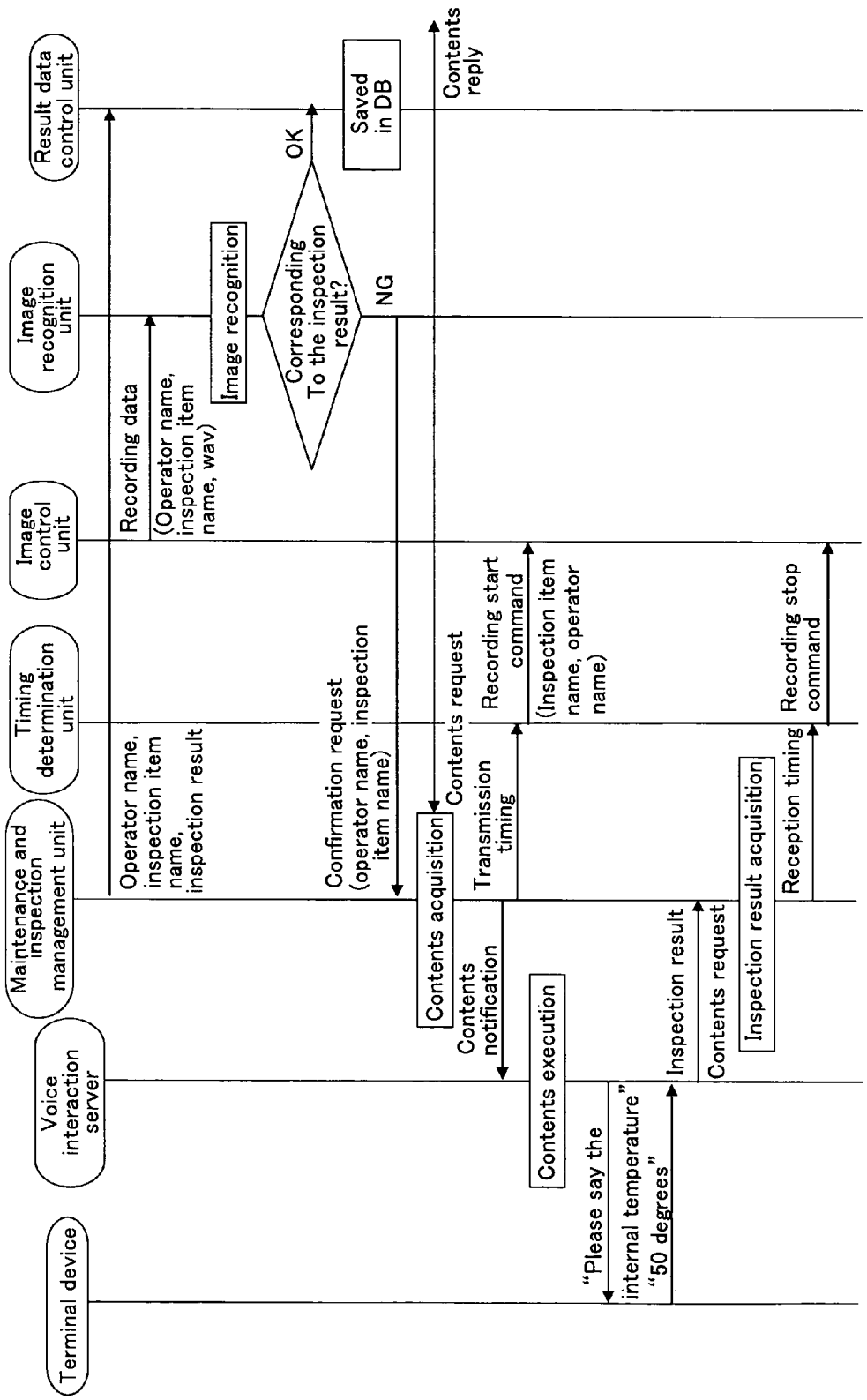
FIG. 11 is a control flowchart of the second embodiment.

The second embodiment of the present invention will be explained with reference to FIGS. 10 and 11.

Here, as in the first embodiment, explanation will be made of a configuration where the inspection technician carries a terminal device 1012 for the presentation of inspection item contents through voice interaction and for input of inspection results, and a video camera 1011 for acquiring image data as a status information acquisition device.

A contents storage unit 1001, maintenance and inspection management unit 1002, timing determination unit 1003, image control unit 1004, inspection result storage unit 1006, voice interaction server 1009, image server 1010, PC 1007, inspection result query screen 1008, video camera 1011, terminal device 1012 and result data control unit 1013 have constitutions respectively identical to the contents storage unit 401, maintenance and inspection management unit 402, timing determination unit 403, image control unit 404, inspection result storage unit 405, voice interaction server 408, image server 409, PC 406, inspection result query screen 407, video camera 410, terminal device 411 and result data control unit 412 of the first embodiment, and the explanations thereof are omitted here.

An image recognition unit 1005, in the same manner as the image recognition unit 209 explained in the schematic configuration 2, acquires image data recorded by the video camera 1011 via the image server 1010, analyzes this image data, and compares it with the inspection result data transmitted from the terminal device 1012. When the result of comparison by the image recognition unit 1005 is non-conformity, a signal is transmitted to the maintenance and inspection management unit 1002 informing of such non-conformity. In response to the signal informing of such non-conformity received from the image recognition unit 1005, the maintenance and inspection management unit 1002 selects inspection item contents for executing re-inspection instructions for the relevant inspection item from the contents storage unit 1001 and transmits such inspection item contents to the terminal device 1012.

The inspection result data input into the terminal device 1012 as a result of execution of the inspection item contents by the voice interaction server 1009, and data such as inspection technician name and inspection item names are transmitted to the result data control unit 1013. Image data acquired by the image control unit 1004 is transmitted to the image recognition unit 1005.

The image recognition unit 1005 analyzes received image data using image recognition to judge whether the image data is consistent with the inspection result data. When judgment is made that the image data is not inconsistent with the inspection result data according to the judgment result, the image data is transmitted to the result data control unit 1013 to cause the data to be stored in the inspection result storage unit 1006. When judgment is made that the image data and inspection result data are inconsistent with each other, a confirmation request signal is transmitted to the maintenance and inspection management unit 1002.

The maintenance and inspection management unit 1002, based on the confirmation request signal, selects the corresponding inspection item contents from the contents storage unit 1001, notifies the voice interaction server 1009 of the contents, and transmits the inspection item contents transmission timing signal to the timing determination unit 1003. The timing determination unit 1003 transmits a recording start command to the image control unit 1004, and causes the video camera 1011 to start recording image data.

The voice interaction server 1009 executes the inspection item contents, acquires the inspection result data from the terminal device 1012, and transmits the inspection result data and the next contents request signal to the maintenance and inspection management unit 1002.

The maintenance and inspection management unit 1002 acquires the inspection result data, and transmits the inspection result data reception timing signal to the timing determination unit 1003. The timing determination unit 1003 transmits the recording stop command to the image control unit 1004, and causes the image data recording to stop.

If as a result of image recognition by the image recognition unit 1005, an inconsistency with the inspection result data is found, the above process is repeated.

Third Embodiment

Figure 14:
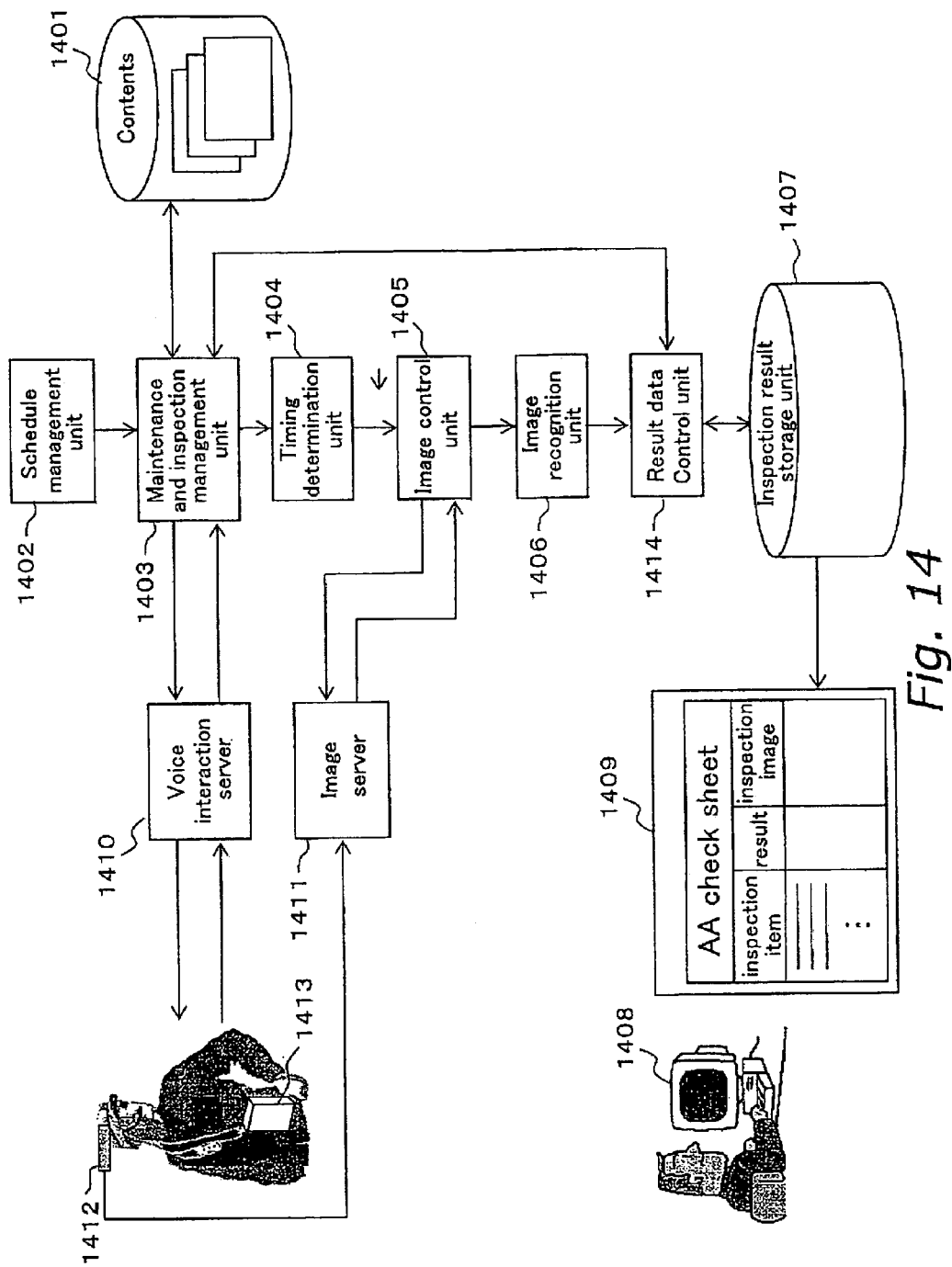
FIG. 14 is a block diagram of the third embodiment.
Figure 15:
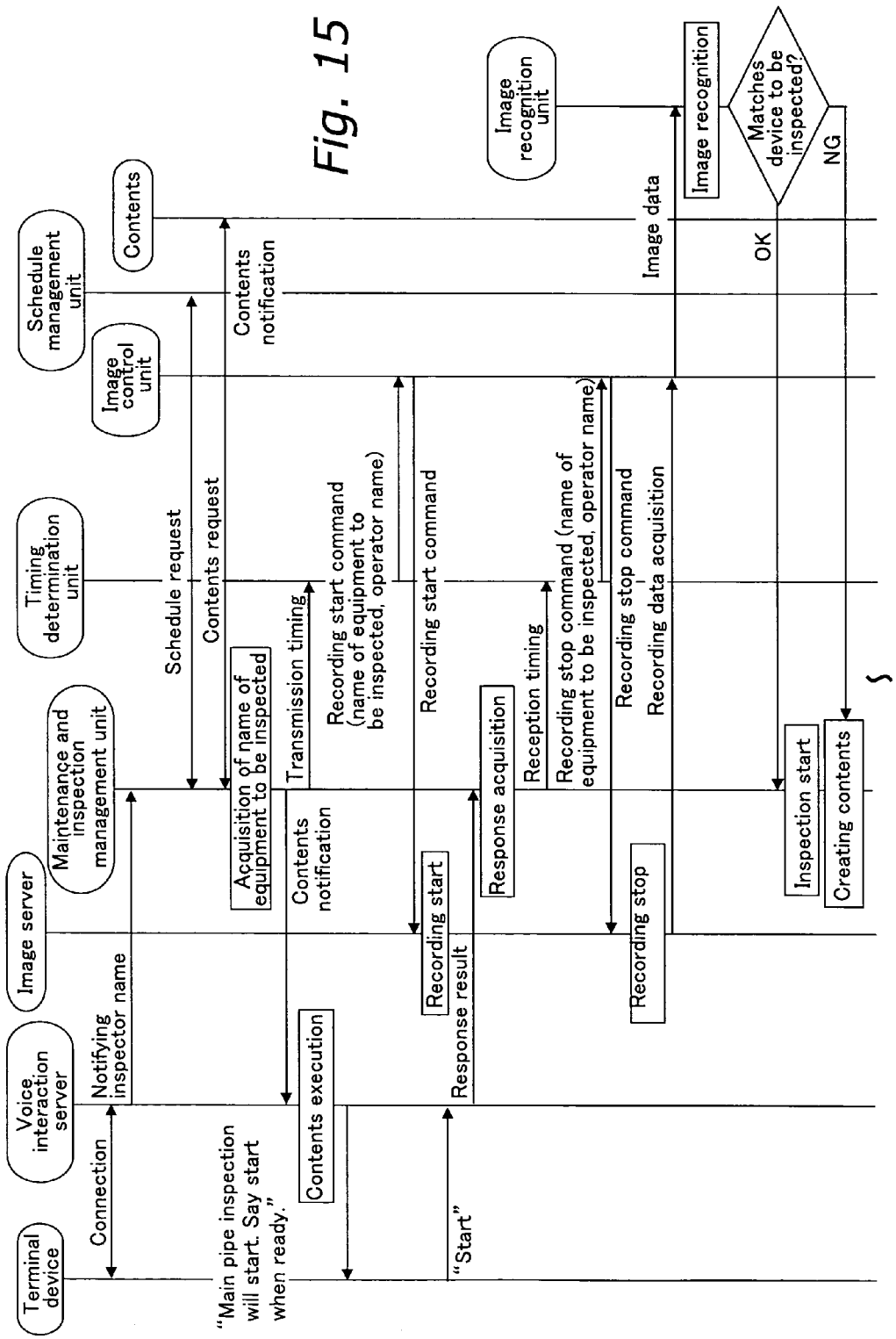
FIG. 15 is a flowchart of the third embodiment.

The third embodiment of the present invention will be explained based on FIGS. 14 and 15.

Here, as in the first embodiment, explanation will be made of a configuration where the inspection technician carries a terminal device 1413 for presentation of inspection item contents through voice interaction and for input of inspection results, and a video camera 1412 for acquiring image data as a status information acquisition device.

A contents storage unit 1401, maintenance and inspection management unit 1403, timing determination unit 1404, image control unit 1405, inspection result storage unit 1407, voice interaction server 1410, image server 1411, PC 1408, inspection result query screen 1409, video camera 1412, terminal device 1413 and result data control unit 1414 have configurations respectively identical to the contents storage unit 401, maintenance and inspection management unit 402, timing determination unit 403, image control unit 404, inspection result storage unit 405, voice interaction server 408, image server 409, PC 406, inspection result query screen 407, video camera 410, terminal device 411 and result data control unit 412 of the first embodiment, and explanations thereof are omitted here.

A schedule management unit 1402 manages an operation schedule or equipment maintenance inspection schedule for inspection technicians, correlating identification information of inspection technicians or equipment with specific operations.

When an inspection technician connects to the voice interaction server 1410 through the terminal device 1413, the voice interaction server 1410 notifies the maintenance and inspection management unit 1403 of the inspection technician's name. The maintenance and inspection management unit 1403 notifies the schedule management unit 1402 of identification information such as inspection technician name, and requests schedule information. Schedule information can be integrated, for example, into an interaction scenario showing maintenance and inspection work procedures. The maintenance and inspection management unit 1403 requests inspection item contents from a contents management unit 1401 based on the acquired schedule information, and transmits the same to the voice interaction server 1410. At this time, a recording start command is transmitted to the image control unit 1405 via the timing determination unit 1404, and image data acquisition by the video camera 1412 commences.

A response is transmitted to the maintenance and inspection management unit 1403 to the effect that as a result of execution of the contents by the voice interaction server 1410, the inspection technician will commence inspection operations. Based on this response received by the maintenance and inspection management unit 1403, a recording stop command is transmitted to the image control unit 1405 via the timing determination unit 1404.

Image data acquired by the image control unit 1405 is transmitted to an image recognition unit 1406. The equipment on which maintenance and inspection is to be performed each has a barcode, QR code or the like attached thereto, and image data from the video camera 1412 carried by the inspection technician records such identification code. The image recognition unit 1406 analyzes the transmitted image data to detect the equipment identification code, and determines whether the equipment matches the schedule managed by a schedule management unit 1403. When it is determined that the equipment matches the schedule, the prescribed maintenance and inspection is started. When it is determined that that the equipment does not match the schedule, contents for sending notice of confirmation needed to the terminal device 1413 are created and transmitted.

Other Embodiments (1) An inspection technician is made to carry a position detector using GPS, and based on information from this position detector, judgment is made whether work is being performed on equipment matching the schedule.

(2) Through image recognition of a barcode or QR code attached to equipment to be inspected, a recording start command and recording stop command are transmitted from the image recognition unit to the image control unit.

(3) In the above described embodiments, examples were given of systems for supporting maintenance and inspection work through voice interaction. Alternatively, text data or image data can be transmitted to a terminal device carried by an inspection technician, and the inspection result data input in the terminal device is acquired. In this case, the contents storage unit stores contents written in HTML, XML or the like so as to include text data or image data. Alternatively, a cell phone terminal carried by the inspection technician can comprise a CHTML browser, so that maintenance and inspection operations are supported through the cell phone terminal CHTML browser. In this case, contents written in CHTML are stored in the contents storage unit.

(4) The terminal device and status information acquisition device may also be configured so that a device installed a maintenance and inspection work site is used.

As explained above, with the present invention, equipment maintenance and inspection operations can be efficiently processed, and the skipping of maintenance and inspection operations, input mistakes or the like can be prevented, thereby enabling acquisition of highly reliable inspection result data.

This application claims priority to Japanese Patent Application No. 2005-314340. The entire disclosure of Japanese Patent Application No. 2005-314340 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An equipment inspection support system that supports an inspection technician who is to perform equipment maintenance inspection by operating a terminal device for sequentially displaying details of work to be performed by the inspection technician and for receiving input of inspection result data from maintenance inspection work, and a status information acquisition device for acquiring status information concerning a maintenance and inspection work site, comprising:
   a contents storage unit for storing inspection item contents for each maintenance and inspection work to be transmitted to the terminal device, and interaction scenarios for determining an order of the inspection item contents to be transmitted to the terminal device according to equipment maintenance inspection procedures;
   a maintenance and inspection management unit for receiving the inspection result data from the terminal device, and for selecting and transmitting to the terminal device the inspection item contents stored in the contents storage unit based on the interaction scenario stored in the contents storage unit and the received inspection result data;
   a timing determination unit for determining timing for status information acquisition by the status information acquisition device based on the inspection item contents transmitted to the terminal device by the maintenance and inspection management unit and the inspection result data transmitted from the terminal device;
   a status information acquisition unit for collecting the status information acquired by the status information acquisition device according to the status information acquisition timing determined by the timing determination unit;
   a result data control unit for creating a result data correspondence table for associating the inspection result data received by the maintenance and inspection management unit with the status information collected by the status information acquisition unit; and
   an inspection result storage unit for storing inspection result data, status information, and result data correspondence table.

2. An equipment inspection support system according to claim 1, wherein the status information acquisition device is a video camera for acquiring image data of the maintenance and inspection work site.

3. An equipment inspection support system according to claim 2, wherein the status information acquisition device further comprises one or more sensors selected from the group consisting of a condenser microphone, odor sensor, temperature sensor, humidity sensor, tactile sensor, pressure sensor, and a sensor for acquiring status information concerning the maintenance and inspection work site other than image data.

4. An equipment inspection support system according to claim 3, wherein the timing determination unit comprises a result data judgment unit for judging whether the inspection result data is normal or abnormal; and
   when the status information acquisition device is a video camera, the status information collected by the status information acquisition unit is correlated with inspection result data and stored in the inspection result storage unit regardless of whether the judgment result by the result data judgment unit was normal or abnormal, and when the status information acquisition device is not a video camera, the status information collected by the status information acquisition unit is correlated with the inspection result data and stored in the inspection result storage unit only when the judgment by the result data judgment unit was abnormal.

5. An equipment inspection support system according to claim 3, wherein the timing determination unit comprises a result data judgment unit for judging whether the inspection result data is normal or abnormal; and
   the status information collected by the status information acquisition unit is correlated with the inspection result data and stored in the inspection result storage unit only when the judgment by the result data judgment unit is abnormal.

6. An equipment inspection support system according to claim 2, further comprising an image recognition unit for analyzing image data transmitted from the status information acquisition device for comparison with the inspection result data transmitted from the terminal device, wherein when there are inconsistencies in the image recognition unit comparison results, inspection item contents giving instructions for re-inspection of the relevant inspection item are transmitted to the terminal device by the maintenance and inspection management unit.

7. An equipment inspection support system according to claim 2, further comprising an object of inspection detector for performing image recognition of image data from the status information acquisition device, determining the identification code attached to the equipment or device to be inspected, and determining conformity with the inspection item contents currently being processed by the maintenance and inspection management unit.

8. An equipment inspection support system according to claim 1, further comprising:
   an inspection result query unit for allowing a third party to query the inspection result data and status information stored in the inspection result storage unit; and
   a re-inspection instruction unit for causing, with respect to the maintenance and inspection work corresponding to the inspection result data and status information stored in the inspection result storage unit, inspection item contents that indicate additional inspection to be transmitted from the maintenance and inspection management unit to the terminal device, and/or causing the status information acquisition unit to reacquire the status information from the status information acquisition device.

9. An equipment inspection support system according to claim 1, wherein status information acquisition means inserts additional information such as maintenance and inspection work location, acquisition time, inspection technician data and the like into acquired status information using an invisible digital watermark.

10. An equipment inspection support method that supports an inspection technician who perform equipment maintenance inspection by operating a terminal device for sequentially displaying details of work to be performed by the inspection technician and for receiving input of inspection result data from the maintenance inspection work, and acquiring status information on a maintenance and inspection work site from a status information acquisition device, comprising:
   storing inspection item contents for each maintenance and inspection work to be transmitted to the terminal device, and interaction scenarios for determining an order of the inspection item contents to be transmitted to the terminal device according to equipment maintenance inspection procedures;

receiving, in a maintenance and inspection management unit, the inspection result data from the terminal device, and selecting and transmitting to the terminal device the stored inspection item contents based on the stored interaction scenario and the received inspection result data;

determining, in a timing determination unit, timing for the acquired status information based on the inspection item contents transmitted to the terminal device by the maintenance and inspection management unit and the inspection result data transmitted from the terminal device;

collecting the acquired status information according to the status information acquisition timing determined by the timing determination unit;

creating a result data correspondence table for associating the inspection result data received by the maintenance and inspection management unit with the acquired status information collected by the status information acquisition unit; and storing the inspection result data, acquired status information, and result data correspondence table.

11. A computer-readable medium storing a program for causing a computer to execute an equipment inspection support method that supports an inspection technician who is to perform equipment maintenance inspection by operating a terminal device for sequentially displaying details of work to be performed by such inspection technician and for receiving input of inspection result data from the maintenance inspection work, and acquiring status information of a maintenance and inspection work site from a status information acquisition device, according to a process comprising:

storing the inspection item contents for each maintenance and inspection work to be transmitted to the terminal device, and interaction scenarios for determining the order of the inspection item contents to be transmitted to the terminal device according to the equipment maintenance inspection procedures;

receiving, in a maintenance and inspection management unit, the inspection result data from the terminal device, and selecting and transmitting to the terminal device the stored inspection item contents based on the stored interaction scenario and the received inspection result data;

determining, in timing determination unit, timing for the acquired status information based on the inspection item contents transmitted to the terminal device by the maintenance and inspection management unit and the inspection result data transmitted from the terminal device;

collecting the status information acquired by the status information acquisition device according to the status information acquisition timing determined by the timing determination unit;

creating a result data correspondence table for associating the inspection result data received by the maintenance and inspection management unit with the status information collected by the status information acquisition unit; and storing the inspection result data, status information, and result data correspondence table.

* * * * *